United States Patent [19]

Ahrendt

[11] Patent Number: 5,164,083
[45] Date of Patent: Nov. 17, 1992

[54] APPARATUS FOR REMOVING OIL FROM A LIQUID SURFACE

[76] Inventor: Matthew R. Ahrendt, 3310 Tinkerbell La., Charlotte, N.C. 28210

[21] Appl. No.: 599,779

[22] Filed: Oct. 17, 1990

[51] Int. Cl.$^5$ .......................... C02L 1/40; B01D 17/12
[52] U.S. Cl. ............................... 210/24213; 210/396; 210/400; 210/526; 210/776; 210/923
[58] Field of Search ............... 210/922, 923, 924, 526, 210/530, 400, 396, 242.3, 396, 400, 776

[56] References Cited

U.S. PATENT DOCUMENTS

| | | | |
|---|---|---|---|
| 3,700,108 | 10/1972 | Richards | 210/242.3 |
| 4,089,784 | 5/1978 | Ettelt et al. | 210/526 |
| 4,146,477 | 3/1979 | Challener | 210/242.3 X |
| 4,349,439 | 9/1982 | Lundin | 210/242.3 |
| 4,642,185 | 2/1987 | Turner et al. | 210/242.3 |
| 4,681,680 | 7/1987 | Delons et al. | 210/924 X |
| 4,876,011 | 10/1989 | Betts et al. | 210/526 |

*Primary Examiner*—Charles Hart
*Attorney, Agent, or Firm*—Ralph H. Dougherty

[57] ABSTRACT

Liquid is contained in a source container and oil is removed from the source container and deposited into a destination container. The apparatus includes a housing having a base, at least one wall upstanding from, and encompassing the periphery of, the base, and a top cover. A two-sided piece of material made of rubber, nylon, vinyl, or other oil gathering capable material forms an endless belt or ribbon. At least one scraper device mounted within the housing facilitates removal of oil from the material. A bi-directional pulley system including a disk rotatably mounted to the housing, adapted for engaging the material, and an electric motor adapted for engaging and rotating the disk, circulate the material from the surface of the liquid through the scraper device and back to the liquid surface. A sump situated within the base of the housing is disposed to collect oil removed from the material, and a conduit from the sump to the destination container conveys oil from the sump to the destination container. An optional device for separating liquid from oil and returning oil free liquid to the source container is also disclosed. The apparatus may be secured to the source container or an external support structure.

26 Claims, 2 Drawing Sheets

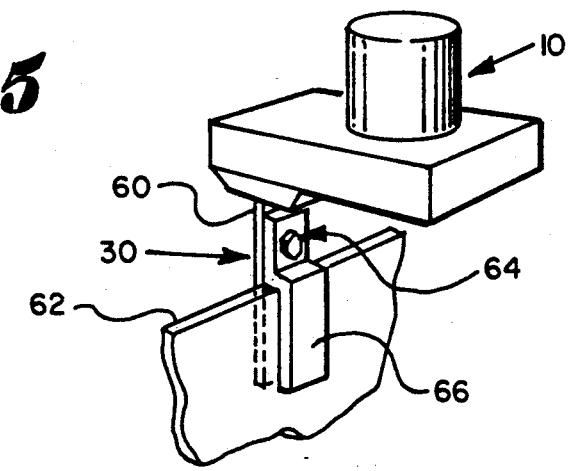
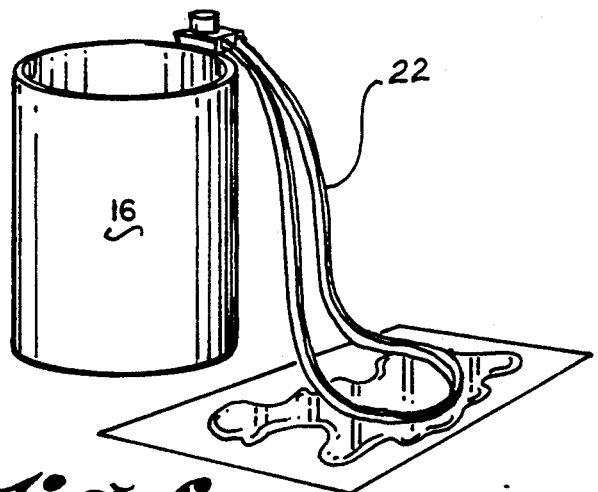
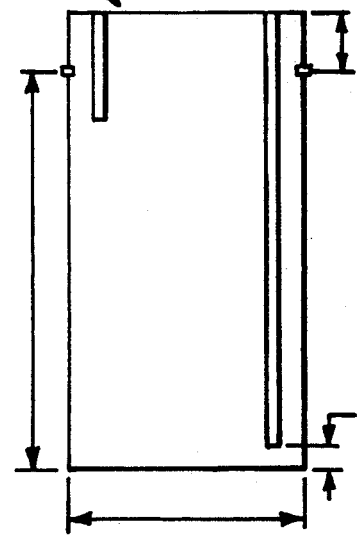
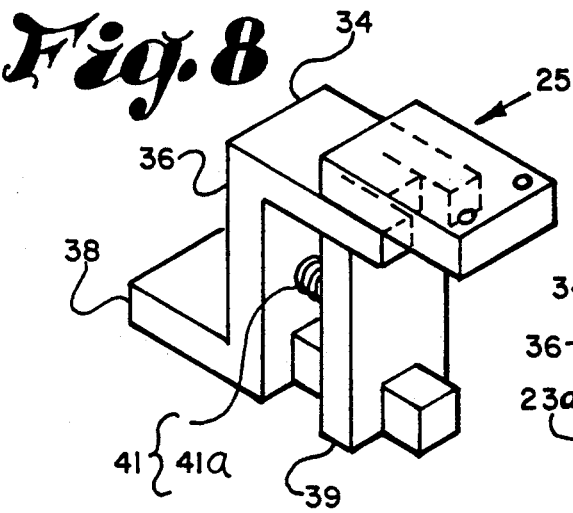
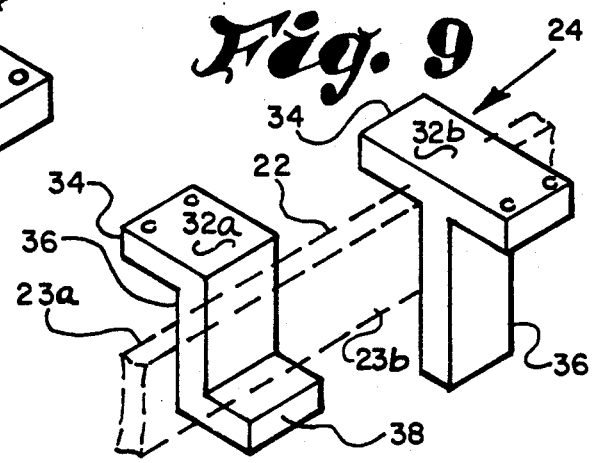

APPARATUS FOR REMOVING OIL FROM A LIQUID SURFACE

BACKGROUND OF THE INVENTION

1. Field of the Invention

The present invention relates to oil skimmers, and more particularly, to an apparatus for removing oil from the surface of a liquid.

2. Description of Related Art

There are a variety of types of oil skimmers currently in use. Disk skimmers, belt skimmers, mop skimmers, and tube skimmers are some of the most popular types of skimmers.

Disk skimmers combine a plastic or metal disk with a wiper blade that scrapes the oil from the disk. The disk is rotated and made to come into contact with a small portion of the liquid surface in a tank. Oil must move into contact with the disk before being removed. Also, a disk skimmer can discharge oil at a height no more than the diameter of the disk above the liquid surface in the tank. If the liquid level in the tank is more than a few inches below the edge of the tank it is not possible to use a disk skimmer. Similarly, since disk skimmers will not work if the liquid level falls below the bottom of the disk, they are ill-suited for use on tanks with fluctuating levels. In addition, since the discharge of the oil is so close to the surface of the liquid, additional mechanisms are required to remove the oil from submerged tanks or sumps that have liquid levels close to floor level.

A belt skimmer is another type of oil skimmer. The belt skimmer includes a plastic or metal belt, a scraper for removal of oil, and a pulley, mounted underneath the surface of the liquid, around which the belt runs. In similar fashion to a disk skimmer, a belt skimmer depends on the migration of oil to a surface area which comes in contact with only a small portion of the liquid surface, namely, the belt. The pulley element typically suffers from several drawbacks. Since the pulley has to be inserted in the liquid, fluctuations of the liquid level can prevent the skimmer from working. Also, contamination of the liquid can occur if the pulley is not compatible with the liquid from which the oil is to be skimmed. In addition, more space is required than is available on some machines to allow the pulley to come into contact with the liquid.

Another type of oil skimmer is the mop skimmer, which consists of a loop of stringy oleophilic material to collect the oil, rollers to squeeze the oil from the mop, and a motor to pull the loop of mop material through the rollers and back into the tank. A disadvantage to the mop type skimmers is the possibility of strands of the mop coming loose and damaging the machine if they are picked up by the pump. Another disadvantage to the mop skimmer is that a large quantity of water is picked up with the oil so disposal costs are higher. A still further disadvantage of the mop skimmer is that the rollers are not very efficient in removing the oil from the mop material. Therefore, the mop material going back to the tank cannot pick up as much oil, thereby taking more time to remove the same amount of oil.

Another type of skimmer uses an oleophilic tube to collect and remove the oil. This type of skimmer includes a tube, scrapers, and means to pull the tube out of the tank and through the scrapers. The skimmer can be used when the liquid level is below the floor or if the liquid level fluctuates. Since the tube is cylindrical the minimum radius that the tube can be bent without affecting the operation of the skimmer is a function of the diameter, wall thickness and material of the tubing. The wall thickness of the tube has to be set depending on the rigidity of the material used and how the material is affected by wear. Since the material is selected for its ability to attract oil, the only variable that can be adjusted to change the minimum radius at which the tube can be bent is the radius. Decreasing the radius decreases the surface area of the tube and the amount of oil that can be picked up is reduced proportionally. In a belt skimmer the minimum radius of bend is determined by the thickness of the belt. The belt thickness is independent of the width of the belt so the surface area and therefore the amount of oil removed can remain the same even though the skimmer can work in smaller areas. Since the belt can be bent into a smaller radius the skimmer can be used on smaller tanks and narrower openings.

Applicant is aware of the following U.S. Patents concerning oil removal apparati.

| U.S. PAT. NO. | INVENTOR | ISSUE DATE | TITLE |
| --- | --- | --- | --- |
| 1,703,963 | Scruby | Mar 5, 1929 | MEANS FOR RAISING OIL FROM WELLS |
| 3,668,118 | Rhodes | Jun 6, 1972 | OIL MOP AND METHOD OF USING SAME |
| 3,774,685 | Rhodes | Nov 27, 1973 | OIL MOP METHOD AND APPARATUS FOR PRODUCING AN OIL WELL |
| 4,388,188 | Morris | Jun 14, 1983 | OIL SPILL RECOVERY MEANS |
| 3,983,034 | Wilson | Sept 28, 1976 | APPARATUS AND METHOD OF REMOVING DEBRIS FLOATING ON A BODY OF WATER |
| 4,673,497 | Lundin | Jun 16, 1987 | OIL-SPILL-COMBATING WATERCRAFT |
| 4,690,093 | Lundin | Sept 1, 1987 | OIL-SPILL-COMBATING WATERCRAFT |
| 4,818,399 | Midkiff | Apr 4, 1989 | OIL SPILLAGE RECOVERY ARRANGEMENT |

Scruby teaches an endless belt that moves down into an oil well and lifts the oil that adheres to it as a heavy film. At ground level, the belt passes around a pulley with a second pulley bearing against the belt; which tends to force the oil off the belt into adjacent troughs.

Rhodes '118 and '685 both teach an oil mop for removing oil from the surface of a body of water. The oil is removed from an endless belt mop by squeezing it through ringers.

Morris teaches boons for confining an oil slick on the high seas, but does not show any scraping device similar to the present invention.

Wilson teaches means for skimming oil from a body of water and discloses that oil removed from a belt into a collection pan by a roller or wiper.

Lundin '497 teaches a separating means, but it does not appear to be a belt scraper.

Lundin '093 shows an endless belt with scraping means, but it scrapes only one side of the belt.

Midkiff teaches another oil recovery arrangement which utilizes siphoning for separating and does not use any belt or scrapers.

None of the related art appear to disclose the structure, operation, and result of the present invented method and apparatus for removing oil from a liquid surface.

SUMMARY OF THE INVENTION

The invention provides an improved apparatus for removing oil from the surface of a liquid.

Liquid is contained in a source container and oil is removed from the source container and deposited into a destination container. The apparatus includes a housing, a two-sided piece of material, means within the housing for simultaneously removing oil from both sides of the material, means integral with the housing for circulating the material through the removal means, means for discharging oil removed from the material into the destination container, and means for securing the apparatus.

The apparatus includes a housing having a base, at least one wall upstanding from, and encompassing the periphery of, the base, and a top cover. A two-sided piece of material made of rubber, nylon, vinyl, or other oil gathering capable material forms an endless belt or ribbon. At least one scraper device mounted within the housing facilitates removal of oil from the material. A bi-directional pulley system including a disk rotatably mounted to the housing, adapted for engaging the material, and an electric motor adapted for engaging and rotating the disk, circulates the material from the surface of the liquid through the scraper device and back to the liquid surface. A sump situated within the base of the housing is disposed to collect oil removed from the material, and a conduit from the sump to the destination container conveys oil from the sump to the destination container. An optional device for separating liquid from oil and returning oil free liquid to the source container is also disclosed. The apparatus may be secured to the source container or an external support structure. A method for removing oil from the surface of a liquid residing in a source container into a destination container is also disclosed.

OBJECTS OF THE INVENTION

The principal object of the invention is to provide an improved skimmer for removing oil from a liquid surface.

A further object of this invention is to provide a skimmer capable of making contact with a large amount of surface area on the liquid surface.

Another object of the invention is to provide a skimmer capable of removing oil regardless of the liquid level in a tank.

A further object of the invention is to provide a skimmer capable of functioning on individual machine sumps.

Another object of the invention is to provide a skimmer capable of separating water from oil and returning the separated water to the tank.

A further object of the invention is to provide a skimmer occupying a limited amount of space.

Another object of the invention is to provide a skimmer easily mountable to, and detachable from, a source container with or without a lip, a destination container with or without a lip, or an auxiliary support structure.

A further object of the invention is to provide a mechanism for extending the useful life of scraper mechanisms.

BRIEF DESCRIPTION OF THE DRAWINGS

The foregoing and other objects will become more readily apparent by referring to the following detailed description and the appended drawings in which:

FIG. 5 is a perspective view of the invention illustrating the "Z" shaped attachment affixed to the anchoring member.

FIG. 6 is a perspective view of the invention shown removing oil from a source container positioned substantially lower than the height of the oil skimmer.

FIG. 7 is a cross-sectional view of a separator means that may be used in connection with the oil skimmer apparatus.

FIG. 8 is an alternative embodiment of the scraper mechanism.

FIG. 9 is a perspective view of a scraper device.

DETAILED DESCRIPTION

Figure 1:
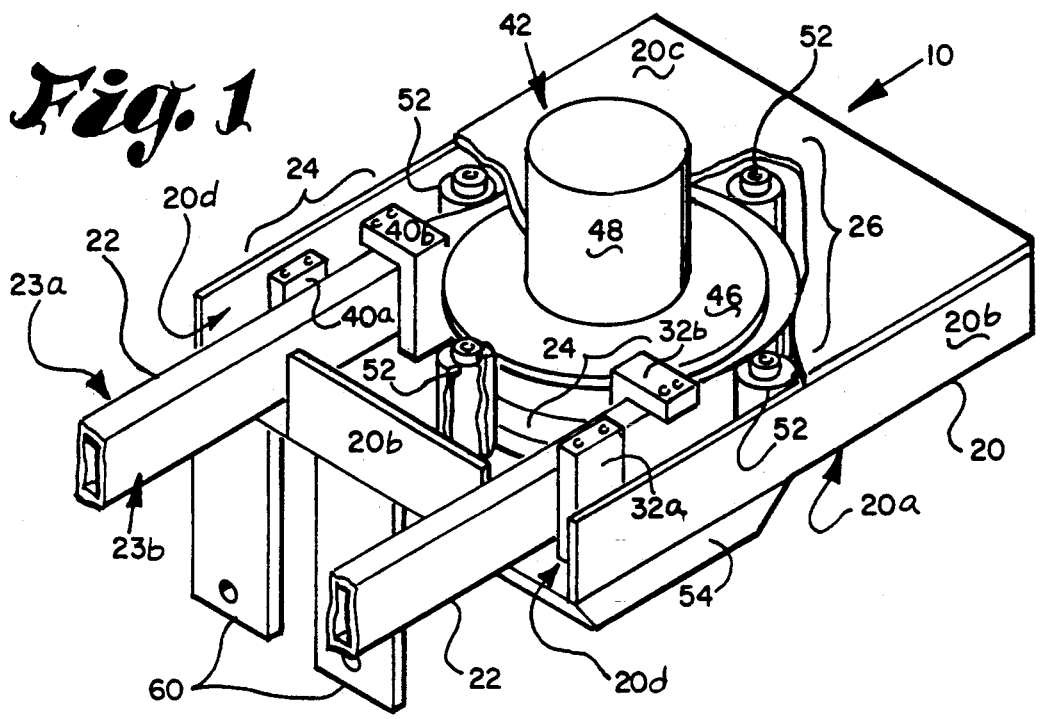
FIG. 1 is a perspective view of the invented apparatus for removing oil from a liquid surface, shown with a portion of the top cover broken away.
Figure 2:
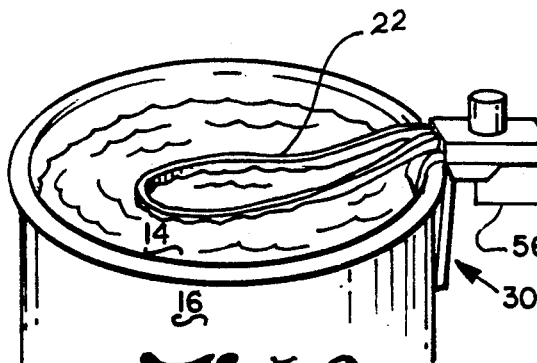
FIG. 2 is a perspective view of the invented apparatus for removing oil from a liquid surface, shown in use attached to a source container.
Figure 3:
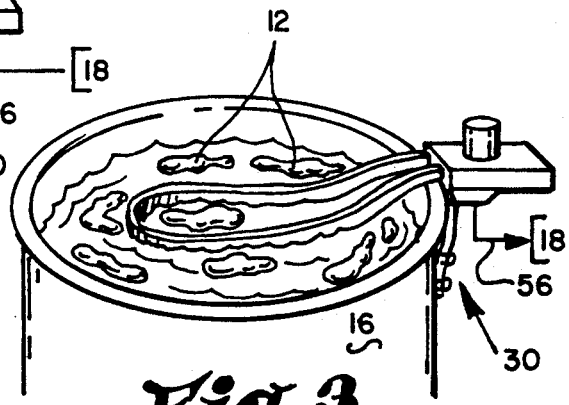
FIG. 3 is a perspective view of the invention mounted to the source container with nuts and bolts.
Figure 4:
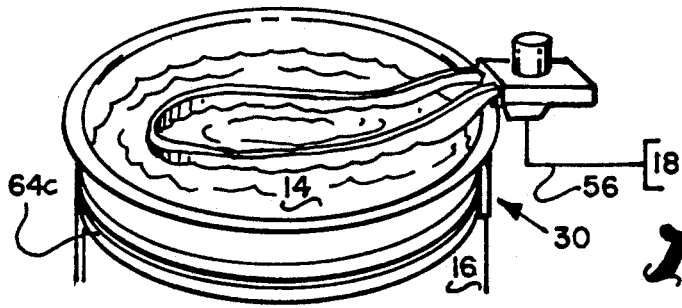
FIG. 4 is a perspective view of the invention attached to the source container with two bands.

Referring now to the drawings, and particularly to FIG. 1, the invented apparatus 10 for removing oil 12 from a liquid 14 surface is shown.

Liquid 14 is contained in a source container 16 and oil 12 is removed from the source container 16 and deposited into a destination container 18. The apparatus 10 includes a housing 20, a two-sided piece of material 22, means 24 within the housing 20 for simultaneously removing oil 12 from both sides of the material 22, means 26 integral with the housing 20 for circulating the material 22 through the removal means 24, means 28 for discharging oil 12 removed from the material 22 into the destination container 18, and means 30 for securing the apparatus 10.

The housing 20 includes a base 20a, at least one wall 20b upstanding from, and encompassing the periphery of, the base 20a, and a top cover 20c. The wall 20b defines at least one opening 20d for permitting passage of the material 22 from the surface of the liquid 14 through the removal means 24 and back to the liquid 14 surface. The housing 20 may be constructed of a variety of substances, including metal, alloy, or plastic. The material 22 may be rubber, nylon, or vinyl, or other oil gathering capable material. Preferably, the material 22 is constructed of rubber and forms an endless belt 22a or ribbon 22b. The material 22 may be hollow or solid and may be advantageously coated with a negatively charged polymer resin such as polyurethane.

The removal means 24 includes at least one scraper mechanism 32 mounted within the housing 20, situated between the liquid 14 surface and the circulation means 26. Scrapers may be composed of metal, plastic, ceramic, cast nylon, or other suitable material. The scraper mechanism 32 is adapted for engaging both sides 23a, 23b of the material 22 and scraping oil 12 from the material 22 upon circulation of the material 22 from the liquid 14 surface through the scraper device 32 and back to the liquid 14 surface. Preferably, the removal means 24 includes a first scraper device 32a mounted within the housing 20 and situated between the liquid 14 surface and the circulation means 26. The first scraper device 32a is adapted for engaging a first side 23a of the material 22. A second scraper device 32b is mounted within the housing 20 between the first scraper device 32a and the circulation means 26. The second scraper device 32b is adapted for engaging a second side 23b of the material 22. Oil 12 is thus scraped from the material 22 upon circulation of the material 22 from the liquid 14 surface through the first 32a and second 32b scraper devices and back to the liquid 14 surface. The first scraper device 32a includes a scraper base 34 affixed to the top of the housing 20 and a stanchion 36 extending downward from the scraper base 34. Additionally, the stanchion 36 may have a horizontal member 38 extending from the bottom of the stanchion 36, parallel to the scraper base 34. The second scraper device 32b also includes a scraper base 34 affixed to the top of the housing 20 and a stanchion 36 extending downward from the scraper base 34.

An auxiliary scraper mechanism 40 may also be provided which includes a third scraper device 40a and a fourth scraper device 40b. The third and fourth scraper devices 40a, 40b are mounted within the housing 20 in similar fashion to the first and second scraper devices, 32a, 32b, however they are mounted such that they engage the material 22 subsequent to the first and second scraper devices 32a, 32b and subsequent to passage of the material 22 through the circulation means 26. Thus, the auxiliary scraper mechanism 40 provides a mechanism for removing residual oil 12 from the material 22 prior to reentry of the material 22 onto the liquid 14 surface. The third scraper device 40a is situated within the housing 22 between the liquid 14 surface and the circulation means 26 and adapted for engaging a first side of the material 23a. The fourth scraper device 40b is situated between the third scraper device 40a and the circulation means 26 and adapted for engaging a second side 23b of the material 22. The structure of the third and fourth scraper devices 40a, 40b is the same as the first and second scraper devices, 32a, 32b, each includes a scraper base 34 affixed to the housing 20 and a stanchion 36 upstanding from the scraper base 34. The third scraper device 40a may optionally be fitted with a horizontal member 38 extending from the top of the stanchion 36, parallel to the scraper base 34.

An alternative scraper mechanism 25 is shown in FIG. 8. The alternative scraper device includes a scraper base 34 affixed to the top of the housing 20 and a stanchion 36 extending downward from the scraper base 34. Additionally, the stanchion 36 may have a horizontal member 38 extending from the bottom of the stanchion 36, parallel to the scraper base 34. A connecting member 39 slidably engages the stanchion 36. A biasing means 41 such as a spring 41a connects the connecting member 39 to the stanchion 36 and is adapted to urge the connecting member 39 against the material 22.

The circulation means 26 includes drive means 42 for continuously moving the material 22 from the liquid 14 surface through the removal means 24 and back to the liquid 14 surface. Preferably, the drive means 42 is a bi-directional pulley system 44 including a disk 46 rotatably mounted to the housing 20, adapted for engaging the material 22, and an electric motor 48 adapted for engaging and rotating the disk 46. The motor 48 is preferably a fractional horsepower right angle gear motor capable of between 60 and 120 rpms. The material 22 is positioned against the disk 46 by positioning means 50 which includes at least one roller mechanism 52 adjacent to the disk 46, rotatably mounted to the housing 20. The roller mechanism 52 maintains pressure on the material 22 and prevents slippage to reduce wear. The material 22 is positioned between and in contact with the exterior side edges of the disk 46 and the roller mechanism 52.

The discharge means 28 includes a sump 54 situated within the base 20a of the housing 20, disposed to collect oil 12 removed by the removal means 24, and a conduit 56 from the sump 54 to the destination container 18, adapted for conveying oil 12 from the sump 54 to the destination container 18. The base 20a of the housing 20 is angled to facilitate the movement of the removed oil to the sump 54. The discharge means 28 may optionally be fitted with means 58 for separating liquid 14 from oil 12 and returning oil free liquid to the source container 16.

The securing means 30 includes an anchoring member 60 depending from the housing 20, a support structure 62, and means 64 for affixing the anchoring member 60 to the support structure 62. A "Z" shaped attachment 66 may be mounted to the anchoring member 60 and adapted for placement over the opening of the source container 16. The support structure 62 may be the source container 16 or an auxiliary structure 62a external to the source container 16. Affixing means 64 includes at least one bolt 64a inserted through the anchoring member 60 and the support structure 62 and at least one nut 64b securing each bolt 64a, or at least one band 64c binding the anchoring member 60 to the support structure 62.

In operation, the apparatus 10 is mounted to the source container 16 or an auxiliary structure 62a. The material 22 is laid on the liquid 14 surface and oil 12 is gathered thereon. Oil 12 is scraped from the material 22 upon circulation of the material 22 from the liquid 14 surface through the removal means 24 and back to the liquid 14 surface. Oil 12 removed from the material 22 collects in the base 20a of the housing 20 and is thereupon removed to the destination container 18.

SUMMARY OF THE ACHIEVEMENT OF THE OBJECTS OF THE INVENTION

From the foregoing, it is readily apparent that I have invented an improved method and apparatus for removing oil from a liquid surface of a container, capable of making contact with a large amount of surface area on the liquid surface, regardless of the liquid level in the tank, utilizing a limited amount of space, than heretofore has been possible.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

I claim:

1. An apparatus for removing oil from the surface of a liquid in a source container, into a destination container, comprising:
   (a) a housing;
   (b) a two-sided piece of material, adapted for placement within said housing and on said liquid surface, for gathering oil thereon, said material being disposed on said liquid surface;
   (c) means within said housing for simultaneously removing oil from both sides of said material;
   (d) means integral with said housing for circulating said material from said liquid surface through said removal means, wherein said removal means includes a first scraper device mounted within said housing, situated between said liquid surface and said circulation means, adapted for engaging a first side of said material, and a second scraper device mounted within said housing, situated between said first scraper device and said circulation means, adapted for engaging a second side of said material, whereby oil is scraped from said material upon circulating said material from said liquid surface through said first and second scraper devices and back to said liquid surface, wherein said first scraper device includes a scraper base affixed to the top of said housing and a stanchion extending downward from said first scraper base;
   (e) means for discharging oil removed from said material into said destination container; and
   (f) means for securing said apparatus.

2. Apparatus according to claim 1, wherein said housing includes a base, at least one wall upstanding from, and encompassing the periphery of, said base, and a top cover, said wall defining at least one opening for permitting passage of said material from said liquid surface through said removal means and back to said liquid surface.

3. Apparatus according to claim 1, wherein said housing is constructed of a substance selected from the group consisting of metal, alloy, and plastic.

4. Apparatus according to claim 1, wherein said material is selected from the group consisting of rubber, nylon, and vinyl.

5. Apparatus according to claim 1, wherein said material is an endless belt.

6. Apparatus according to claim 5, wherein said endless belt is a ribbon.

7. Apparatus according to claim 1, further comprising said stanchion having a horizontal member extending from the bottom of said stanchion, parallel to said first scraper base.

8. Apparatus according to claim 1, wherein said second scraper device includes a scraper base affixed to the top of said housing and a stanchion extending downward from said second scraper base.

9. Apparatus according to claim 1, further comprising a third scraper device mounted within said housing, situated between said liquid surface and said circulation means, adapted for engaging a first side of said material, and a fourth scraper device mounted within said housing, situated between said third scraper device and said circulation means, adapted for engaging a second side of said material, whereby oil is scraped from said material upon circulating said material from said liquid surface through said third and fourth scraper devices and back to said liquid surface.

10. Apparatus according to claim 9, wherein said third scraper device includes a scraper base affixed to the top of said housing and a stanchion extending downward from said third scraper base.

11. Apparatus according to claim 10, further comprising said stanchion having a horizontal member extending from the bottom of said stanchion, parallel to said third scraper base.

12. Apparatus according to claim 9, wherein said fourth scraper device includes a scraper base affixed to the top of said housing and a stanchion extending downward from said fourth scraper base.

13. Apparatus according to claim 1, wherein said circulation means includes a drive means for continuously moving said material from said liquid surface through said removal means and back to said liquid surface.

14. Apparatus according to claim 13, wherein said drive means is a pulley system including a disk rotatably mounted to said housing, adapted for engaging said material, and a motor adapted for engaging and rotating said disk.

15. Apparatus according to claim 14, wherein said pulley system is bi-directional.

16. Apparatus according to claim 14, wherein said motor is electric.

17. Apparatus according to claim 14, further comprising means for positioning said material against said disk.

18. Apparatus according to claim 17, wherein said positioning means includes at least one roller mechanism adjacent to said disk, rotatably mounted to said housing, said material positioned between and in contact with the exterior side edges of said disk and said roller mechanism.

19. Apparatus according to claim 1, wherein said discharge means includes:
   (a) a sump situated within the base of said housing, disposed to collect oil removed by said removal means; and
   (b) a conduit from said sump to said destination container, adapted for conveying oil from said sump to said destination container.

20. Apparatus according to claim 1, further comprising said discharge means having means for separating liquid from oil and returning oil free liquid to said source container.

21. Apparatus according to claim 1, wherein said securing means includes:
   (a) an anchoring member depending from said housing;
   (b) a support structure; and
   (c) means for affixing said anchoring member to said support structure.

22. Apparatus according to claim 21, further comprising said anchoring means having a "Z" shaped attachment mounted to said anchoring means and adapted for placement over the opening of said source container.

23. Apparatus according to claim 21, wherein said support structure is said source container.

24. Apparatus according to claim 21, wherein said support structure is external to said source container.

25. Apparatus according to claim 21, wherein said affixing means includes at least one bolt inserted through said anchoring member and said support structure and at least one nut securing said bolt.

26. Apparatus according to claim 21, wherein said affixing means includes at least one band binding said anchoring member to said support structure.

* * * * *